US010619276B2

(12) United States Patent
Kurashima et al.

(10) Patent No.: US 10,619,276 B2
(45) Date of Patent: Apr. 14, 2020

(54) NONWOVEN FABRIC WEB

(71) Applicant: 3M INNOVATIVE PROPERTIES COMPANY, St. Paul, MN (US)

(72) Inventors: Daisuke Kurashima, Tokyo (JP); Koji Imai, Kanagawa Pref. (JP); Kenichi Yoda, Kanagawa (JP)

(73) Assignee: 3M Innovative Properties Company, St. Paul, MN (US)

( * ) Notice: Subject to any disclaimer, the term of this patent is extended or adjusted under 35 U.S.C. 154(b) by 73 days.

(21) Appl. No.: 15/302,513

(22) PCT Filed: Apr. 28, 2015

(86) PCT No.: PCT/US2015/027937
§ 371 (c)(1),
(2) Date: Oct. 7, 2016

(87) PCT Pub. No.: WO2015/168085
PCT Pub. Date: Nov. 5, 2015

(65) Prior Publication Data
US 2017/0044699 A1    Feb. 16, 2017

(30) Foreign Application Priority Data

May 2, 2014    (JP) .................................. 2014-095431

(51) Int. Cl.
*D04H 13/00*    (2006.01)
*B32B 5/02*    (2006.01)
(Continued)

(52) U.S. Cl.
CPC .............. *D04H 13/00* (2013.01); *B32B 5/022* (2013.01); *B32B 5/26* (2013.01); *B32B 25/08* (2013.01);
(Continued)

(58) Field of Classification Search
CPC ........ D04H 1/4382; D04H 1/542; D04H 1/56; D04H 5/06; D04H 13/00; B32B 5/26;
(Continued)

(56) References Cited

U.S. PATENT DOCUMENTS 4,118,531 A    10/1978 Hauser
5,841,081 A *  11/1998 Thompson ............ B29C 43/006
                                                     428/298.4
(Continued)

FOREIGN PATENT DOCUMENTS

CN    2009-184296    8/2009
CN    101994213    3/2011
(Continued)

OTHER PUBLICATIONS

Yamada et al., English Translation to JP-2008132972-A obtained from European Patent Office website. (Year: 2008).*
(Continued)

*Primary Examiner* — Jeremy R Pierce
(74) *Attorney, Agent, or Firm* — Philip P. Soo; Harold C. Knecht, III (57) ABSTRACT

A nonwoven fabric web having an excellent sound absorption coefficient in a frequency range from 800 Hz to 1000 Hz when used as a sound absorbing member for a vehicle exterior. The nonwoven fabric web including a nonwoven fabric having meltblown fibers and binder fibers arranged so as to be confounded with the meltblown fibers and fused with the meltblown fibers at some of the confounding points at the very least, the weight per unit area of the nonwoven fabric being from 400 g/m² to 1500 g/m², and the flexural rigidity of the nonwoven fabric being from 2.0 N/50 mm to 20.0 N/50 mm.

13 Claims, 6 Drawing Sheets

(51) Int. Cl.
   B32B 5/26      (2006.01)
   D04H 1/4382    (2012.01)
   D04H 1/542     (2012.01)
   D04H 1/56      (2006.01)
   D04H 5/06      (2006.01)
   G10K 11/168    (2006.01)
   G10K 11/162    (2006.01)
   D04H 5/02      (2012.01)
   B60R 13/08     (2006.01)
   B32B 25/08     (2006.01)
   B32B 25/14     (2006.01)
   B32B 27/08     (2006.01)
   B32B 27/32     (2006.01)
   B32B 27/36     (2006.01)

(52) U.S. Cl.
   CPC .............. *B32B 25/14* (2013.01); *B32B 27/08* (2013.01); *B32B 27/32* (2013.01); *B32B 27/36* (2013.01); *B60R 13/08* (2013.01); *B60R 13/0861* (2013.01); *D04H 1/4382* (2013.01); *D04H 1/542* (2013.01); *D04H 1/56* (2013.01); *D04H 5/02* (2013.01); *D04H 5/06* (2013.01); *G10K 11/162* (2013.01); *G10K 11/168* (2013.01); *B32B 2307/102* (2013.01); *B32B 2605/00* (2013.01)

(58) Field of Classification Search
   CPC ........ B32B 5/022; B32B 27/08; B32B 27/32; B32B 27/36; B32B 2307/102; B32B 2605/00
   See application file for complete search history.

(56)     References Cited

U.S. PATENT DOCUMENTS 7,448,468 B2   11/2008   Czerny et al.
   8,278,228 B2   10/2012   Kaneda
   2003/0077969 A1*  4/2003  Tanaka .................. B32B 5/26
                                                        442/334
   2004/0097155 A1   5/2004  Olson et al.
   2009/0117806 A1   5/2009  Kaneda
   2010/0196686 A1*  8/2010  Van Dam ................ B32B 5/14
                                                        428/219
   2013/0062871 A1*  3/2013  Uehara .................. B32B 5/08
                                                        280/850
   2015/0053606 A1   2/2015  Sakamoto

FOREIGN PATENT DOCUMENTS

EP    2 022 678         2/2009
   EP    2 365 483         9/2011
   JP    H11-200217        7/1999
   JP    3657415 B2        3/2005
   JP    2007-83923        4/2007
   JP    2008132972 A   *  6/2008
   JP    2009-57663        3/2009
   JP    2009-287143      12/2009
   JP    2011-94261        5/2011
   JP    2012-012803       1/2012
   JP    2014-81638        5/2014
   WO    WO 97/00989       1/1997
   WO    WO 2005/007458    1/2005
   WO    WO 2007/114154   10/2007
   WO    WO 2009/032495    3/2009
   WO    WO 2011/110588    9/2011

OTHER PUBLICATIONS

Wente, "Manufacture of Superfine Organic Fibers," Naval Research Laboratories Report 4364, May 1954, 21 pages.
Wente, "Superfine Thermoplastic Fibers," Industrial and Engineering Chemistry, Aug. 1956, vol. 48, No. 8, pp. 1342-1346.
International Search Report for PCT International Application No. PCT/US2015/027937, dated Jul. 13, 2015, 4 pages.

* cited by examiner

NONWOVEN FABRIC WEB

CROSS REFERENCE TO RELATED APPLICATIONS

This application is a national stage filing under 35 U.S.C. 371 of PCT/US2015/027937, filed Apr. 28, 2015, which claims the benefit of Japanese Application No. 2014-095431, filed May 2, 2014, the disclosures of which are incorporated by reference in their entireties herein.

CONVENTIONAL TECHNOLOGY

The present invention relates to a nonwoven fabric web, and more particularly to a sound absorbing material using a nonwoven fabric web.

BACKGROUND TECHNOLOGY

Sound absorbing materials are used to suppress various types of noise. For example, a sound absorbing material for a vehicle exterior is used to suppress vehicle exterior noise (moving car noise generated when traveling) that infiltrates the interior of the vehicle. Examples of documents serving as references in this field include Japanese Unexamined Patent Application Publication No. 2007-261359 and Japanese Unexamined Patent Application Publication No. 2009-184296.

In the Japanese Unexamined Patent Application Publication No. 2007-261359 is disclosed a sound absorbing material for a vehicle exterior having a nonwoven fabric comprising main fibers and binder fibers, wherein the nonwoven fabric is provided with a resin layer formed by heating a powdery resin provided on the surface of the nonwoven fabric, and the resin layer is porous with part of the powdery resin remaining in a particulate state.

In the Japanese Unexamined Patent Application Publication No. 2009-184296 is disclosed a sound absorbing material consisting of a composite nonwoven fabric formed by laminating and integrating an organic fiber nonwoven fabric (A) and a meltblown nonwoven fabric (B) consisting of organic fibers with a fineness of at most 0.5 dtex, wherein the organic fiber nonwoven fabric (A) consists of 10 to 90 wt. % of heat-bonding organic fibers (a) having a core-sheath structure with a fineness of 1.1 to 22 dtex and 10 to 90 wt. % of actually crimped-type polyester short fibers (b) having a fineness of 2.2 to 33 dtex, and the composite nonwoven fabric is formed by performing heat treatment with a dryer or by heated roll processing on the laminated organic fiber nonwoven fabric (A) and the meltblown nonwoven fabric (B) so as to melt the heat-bonding organic fibers (a) having a core-sheath structure so that the organic fiber nonwoven fabric (A) and the meltblown nonwoven fabric (B) are formed integrally.

SUMMARY OF THE INVENTION

Sound absorbing materials are required to have a high sound absorption coefficient in frequency ranges corresponding to the usage environment, the purpose of use, or the like. For example, when used in a sound absorbing member for a vehicle exterior, a sound absorbing material (for example, a sound absorbing material provided with a nonwoven fabric web) having an excellent sound absorption coefficient with respect to sounds in the frequency range from 800 Hz to 1000 Hz (for example, noise originating from road noise such as friction or collision between the road surface and the tires while the vehicle is moving) is desirable.

The present invention provides, as one mode, a nonwoven fabric web provided with a nonwoven fabric having meltblown fibers and binder fibers arranged so as to be confounded with the meltblown fibers and fused with the meltblown fibers at some of the confounding points at the very least, the weight per unit area of the nonwoven fabric being from 400 $g/m^2$ to 1500 $g/m^2$, and the flexural rigidity of the nonwoven fabric being from 2.0 N/50 mm to 20.0 N/50 mm.

With the present invention, it is possible to provide a nonwoven fabric web having an excellent sound absorption coefficient with respect to sounds in the frequency range from 800 Hz to 1000 Hz when used in a sound absorbing member for a vehicle exterior (for example, a fender liner).

BRIEF DESCRIPTION OF THE DRAWINGS

FIG. 4($a$) is a schematic diagram for illustrating the mounting position of a fender liner.

FIG. 4($b$) is a partial cross-sectional view along line IVb-IVb in (a).

FIG. 5($a$) illustrates the results of vertical incident sound absorption coefficient measurements for the nonwoven fabric webs of Working Examples 1 to 6 and Comparative Examples 1 to 4.

FIG. 5($b$) illustrates the results of vertical incident sound absorption coefficient measurements for the nonwoven fabric webs of Working Examples 1 to 6 and Comparative Examples 1 to 4 at frequencies of 800 Hz and 1000 Hz.

FIG. 6($a$) illustrates the results of vertical incident sound absorption coefficient measurements for the nonwoven fabric webs of Working Examples 7 to 9.

FIG. 6($b$) illustrates the results of vertical incident sound absorption coefficient measurements for the nonwoven fabric webs of Working Examples 7 to 9 at frequencies of 800 Hz and 1000 Hz.

FIG. 7($a$) illustrates the results of vertical incident sound absorption coefficient measurements for the nonwoven fabric webs of Reference Examples 1 to 5.

FIG. 7($b$) illustrates the results of vertical incident sound absorption coefficient measurements for the nonwoven fabric webs of Reference Examples 1 to 5 at frequencies of 800 Hz and 1000 Hz.

MODES FOR CARRYING OUT THE INVENTION

Preferred embodiments of the present invention will be described in detail hereinafter with reference to the drawings, but the nonwoven fabric web of the present invention is not limited to the following embodiments. In the following explanations, identical or equivalent portions are labeled with the same symbols, and duplicate explanations will be omitted.

In this specification, meltblown fibers refer to fibers formed narrowly by extrusion into a flow of a high-speed gas (air, for example), in particular, among fibers molded into a thread shape (or filament shape) through a die (metal mold) by melting a thermoplastic material. The molten thermoplastic material molded into a thread shape or a filament shape are drawn by the flow of the high-speed gas, and the diameter thereof is reduced.

The fiber diameters of these meltblown fibers may be less than approximately 20 micrometers (μm) or approximately 1 to 10 μm. In addition, binder fibers refer to short fibers serving the roll of binders for linking fibers (for example, linkage by fusion).

Further, a web refers to an article (a sheet, for example) formed when fibers are linked or entangled with one another.

Firstly, the nonwoven fabric web of a first embodiment will be described.

Figure 1:
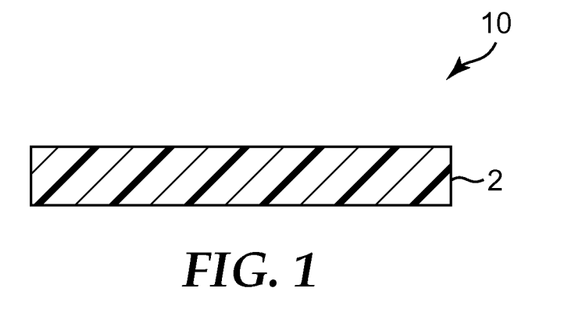
FIG. 1 is a schematic cross-sectional view illustrating an example of a nonwoven fabric web of a first embodiment.

FIG. 1 is a schematic cross-sectional view illustrating an example of a nonwoven fabric web of a first embodiment. A nonwoven fabric web 10 of the first embodiment consists of a single layer of a nonwoven fabric 2 having meltblown fibers and binder fibers. The binder fibers are arranged so as to be confounded with the meltblown fibers, and both fibers are fused at some of the confounding points at the very least.

In the nonwoven fabric 2, a plurality of meltblown fibers (long fibers) injected consecutively in a molten state from a die and binder fibers (short fibers) facing various directions are confounded, and both fibers are fused at some of the intersections of the meltblown fibers and the binder fibers at the very least. In the nonwoven fabric 2, there may be fusion between binder fibers and other binder fibers as well as fibers between the meltblown fibers and the binder fibers. The specific production method will be described below, but the nonwoven fabric 2 can be obtained, for example, by blowing and confounding binder fibers with respect to the flow of the meltblown fibers injected consecutively from a die so as to form a web consisting of meltblown fibers and binder fibers, and then compressing the web by heating and pressing the web in a state in which the binder fibers are dispersed facing various directions.

Accordingly, the binder fibers preferably have a thermal property that allows them to melt or soften so as to be fused with the meltblown fibers when the web is heated, or the like. Further, the melting temperature (or softening temperature) of the binder fibers is preferably lower than the melting temperature (or softening temperature) of the meltblown fibers. Here, the melting temperature refers to the "melting temperature" according to JIS K7121 (1987), and the softening temperature refers to the "Vicat softening temperature" according to JIS K7206 (1999).

The nonwoven fabric 2 constituting the nonwoven fabric web 10 of the first embodiment has an overall weight per unit area from 400 g/m$^2$ to 1500 g/m$^2$ and a flexural rigidity from 2.0 N/50 mm to 20.0 N/50 mm.

Next, the production method of the nonwoven fabric web 10 of the first embodiment will be described. The nonwoven fabric web 10 of the first embodiment comprises the nonwoven fabric 2 consisting of a single layer, so the production method of the nonwoven fabric 2 corresponds to the production method of the nonwoven fabric web 10.

Figure 2:
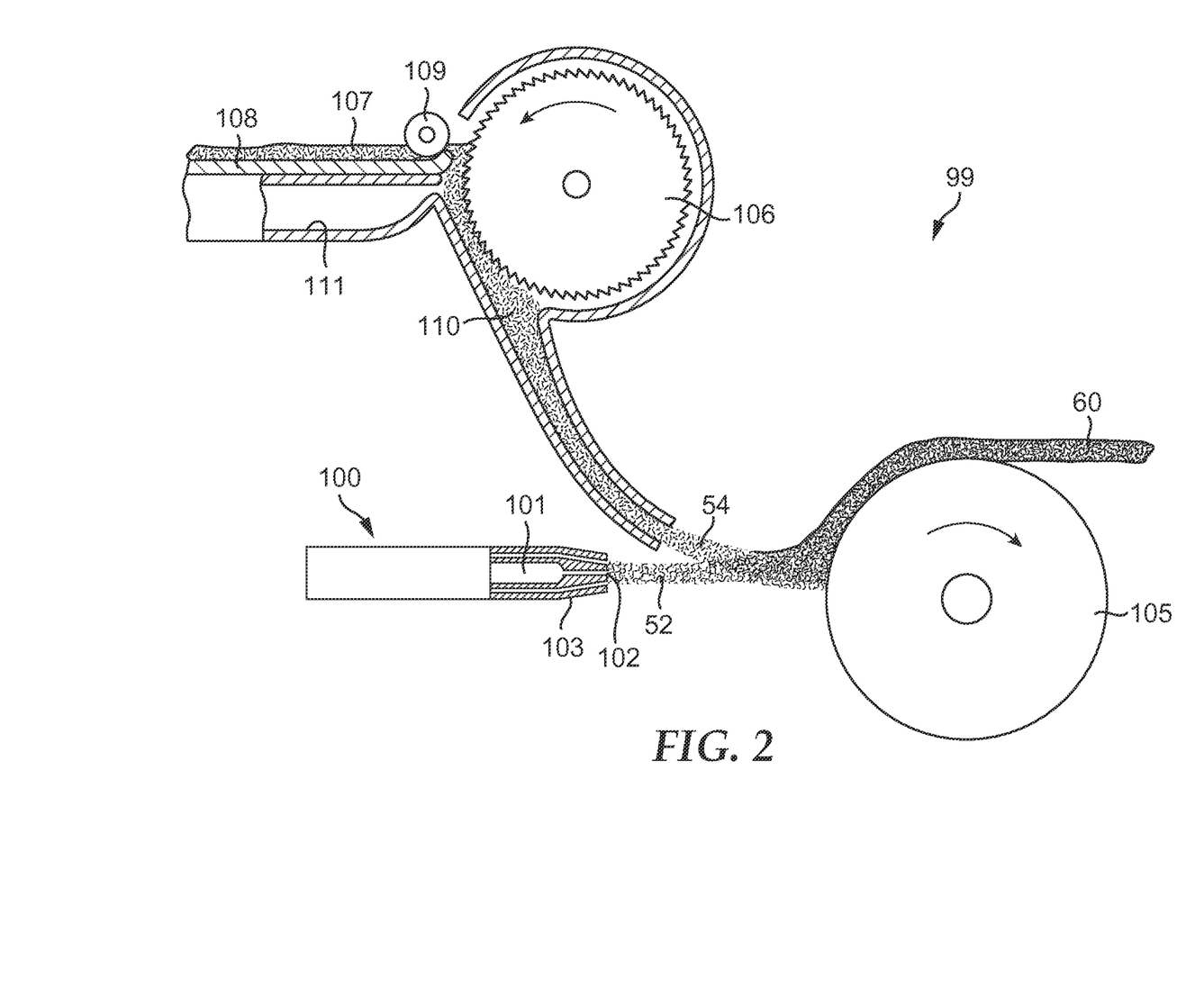
FIG. 2 is a schematic diagram illustrating a production method of the nonwoven fabric constituting the nonwoven fabric web of the first embodiment.

The nonwoven fabric 2 can be produced by preparing a web 60 using a unit for supplying meltblown fibers and a unit for supplying binder fibers and then heating and pressing the web 60. FIG. 2 is a schematic diagram illustrating the production method of the nonwoven fabric 2 constituting the nonwoven fabric web of the first embodiment. This device is the same device as that disclosed in U.S. Pat. No. 4,118,531 of Hauser.

As illustrated in FIG. 2, using a meltblown device provided with an extruder (not illustrated) and a meltblown die 100 having an extrusion chamber 101 through which a molten thermoplastic material (thermoplastic resin or the like) is propelled, a die orifice 102 through which the molten thermoplastic material is extruded, and coordinated gas orifices 103 through which a gas (typically heated air) is forcibly injected at high speed, a molten resin supplied from the extruder is extruded from the meltblown die 100 so as to form meltblown fibers 52 (meltblown method). This high-speed gas stretches out and refines the extruded thermoplastic material. When the refined thermoplastic material (refined fibers) moves to the formation surface of an accumulation device, the thermoplastic material coagulates. The aspect ratio of the refined fibers (ratio of the length to the fiber diameter) gradually approaches infinity. The meltblown fibers may be severed at the time of refinement by the high-speed gas, so it is known that the length of the fibers are not necessarily uniform.

The meltblown device illustrated in FIG. 2 may have a conventional structure such as that disclosed in "Superfine Thermoplastic Fibers" by Wente, Van A. or Report No. 4364 of the Naval Research Laboratories, and both are cited by U.S. Pat. No. 4,118,531 of Hauser.

The web 60 is produced by blowing the meltblown fibers 52 formed in this way into a rotating drum 105 including a screen or the like having fine holes opened in the surface so as to accumulate the fibers on the drum surface. This drum 105 has at least the same width as that of the meltblown die 100. In addition, the surface of the drum 105 is set at a distance within a range of 0.3 to 1 m or 0.38 to 0.64 m from the meltblown die 100. In FIG. 2, an example in which fibers are accumulated on the surface of the rotating drum 105 is illustrated, but the object of accumulation (accumulation device) may, for example, be a belt conveyor or the like, or a combination of a plurality of drums or belt conveyors. In addition, an aspiration device may be provided on the back side of the surface of the accumulation device where fibers are accumulated (formation surface), and the meltblown fibers 52 may be aspirated at the same time as they are blown onto the formation surface.

The rotation speed of the drum 105 (or the operating speed of the accumulation device) is preferably set to a rotation speed sufficiently slower than the injection rate of the meltblown fibers 52. By adjusting the rotation speed of the drum 105, it is possible to adjust the weight per unit area of the resulting web 60 and the nonwoven fabric 2. For example, when the rotation speed of the drum is set to a slow level, the amount of fibers accumulated on the drum surface increases, which makes it possible to increase the weight per unit area.

When forming the web 60 by blowing the meltblown fibers 52 onto the drum 105, binder fibers 54 can be mixed into the web 60 using a fiber blowing device positioned above the meltblown device. That is, as illustrated in FIG. 2, the mixing of the binder fibers 54 is performed using a fiber blowing device having a chute 108, a drive roll 109, a lickerin roll 106, a duct 110, and an air supply duct 111. A fiber aggregate 107 serving as a raw material for the binder fibers 54 is moved along the chute 108 by the drive roll 109. When the front end thereof reaches the lower part of the drive roll 109, it is plucked off by the lickerin roll 106, and the fibers plucked from the fiber aggregate 107 are supplied to the duct 110 as binder fibers 54. When an air flow generated by the rotation of the lickerin roll 106 or an air flow supplied from the air supply duct 111 flows into the duct 110, the binder fibers 54 are blown against the flow of the meltblown fibers 52 injected from the meltblown die 100. In this way, it is possible to incorporate the binder fibers 54 into the flow of the meltblown fibers 52, and a web 60 in which the meltblown fibers 52 and the binder fibers 54 are mixed with one another is thereby produced. This results in a state in which the meltblown fibers 52 and the binder fibers 54 are compounded in the web 60. The amount of blowing of the binder fibers 54 (that is, the compounding ratio of the binder fibers 54) can be set based on the rotational speed of the lickerin roll 106, the supply rate of air from the air supply duct 111, or the like.

The fiber aggregate 107 may be produced by conventional fiber opening equipment. For example, it may be produced by a garnet machine—that is to say, a RANDO-WEBBER.

Next, the nonwoven fabric 2 (nonwoven fabric web 10) of the present invention is produced by heating and pressing the resulting web 60. At this time, the meltblown fibers 52 and the binder fibers 54 are sufficiently heated so as to induce fusion at the contact points (intersections) thereof, and are pressed and compressed in the upward and/or downward direction in the thickness direction of the web 60. By controlling the heating and pressing conditions for the web 60, the thickness or solidity of the resulting nonwoven fabric can be adjusted. The nonwoven fabric 2 can be used after being molded into a desired shape, but the nonwoven fabric 2 may also be molded after the nonwoven fabric 2 is obtained, and the heating and pressing described above may also be performed after the web 60 is molded into a desired shape.

The heating temperature can be set appropriately in accordance with the type of fibers constituting the web 60, but the temperature is equal to or higher than a temperature at which at least some of the binder fibers 54 melt. The temperature is preferably a temperature at which the binder fibers 54 melt but the meltblown fibers 52 do not melt. When binder fibers having a core-sheath structure are sued, they may be used under conditions in which only the sheath part melts. The heating method is not limited, and a method of directly heating the web using a lamp, a heater, or the like, a method of indirectly heating the web at the time of compression by heating the press portion of a pressing device used at the time of compression, or the like may be used. The pressing pressure can be set appropriately, and may be set, for example, to 10 MPa. The method of pressing is not limited, and a method of pressing using a pressing machine, a calender, a pressure roller, or the like may be used.

The weight per unit area of the nonwoven fabric 2 is from 400 g/m² to 1500 g/m² but is preferably from 600 g/m² to 1500 g/m², more preferably from 800 g/m² to 1500 g/m², and even more preferably from 100 g/m² to 1500 g/m². By setting the weight per unit area to at least 400 g/m², it is possible to provide the nonwoven fabric with moderate flexural rigidity. In addition, by setting the weight per unit area to at most 1500 g/m², it is possible to improve the sound absorption coefficient in medium frequency ranges (for example, 800 Hz to 1000 Hz). The weight per unit area of the nonwoven fabric 2 can be adjusted by controlling the content ratio of the meltblown fibers 52 and the binder fibers 54, the injection rate of the meltblown fibers 52 in the production method of the nonwoven fabric 2 described above, the blowing rate of the binder fibers 54, the operating speed of the accumulation device, or the like.

The flexural rigidity of the nonwoven fabric 2 is from 2.0 N/50 mm to 20.0 N/50 mm but is preferably from 3.0 N/50 mm to 20.0 N/50 mm, more preferably from 5.0 N/50 mm to 20.0 N/50 mm, and even more preferably from 7.0 N/50 mm to 20.0 N/50 mm. By setting the flexural rigidity to at least 2.0 N/50 mm, it is possible to further improve the sound absorption coefficient of the sound absorbing material provided with the nonwoven fabric web—in particular, the sound absorption coefficient in the frequency range from 800 Hz to 1000 Hz. In addition, by setting the flexural rigidity to at most 15.0 N/50 mm, it is possible to improve the sound absorption coefficient in medium frequency ranges (for example, 800 Hz to 1000 Hz). The flexural rigidity of the nonwoven fabric 2 can be adjusted by controlling the content ratio of the meltblown fibers 52 and the binder fibers 54 or the weight per unit area of the nonwoven fabric 2, compression processing of the web 60, or the like. The flexural rigidity indicates a value measured based on a three-point flexural test (method A) of JIS K7074 (1998).

The thickness of the nonwoven fabric 2 is not particularly limited and may be at most 10 mm, at most 5 mm, or at most 3 mm. When the thickness of the nonwoven fabric 2 is within such a range, it is possible to use the nonwoven fabric web 10 of this embodiment even in narrow spaces, which is preferable.

The solidity of the nonwoven fabric 2 is not particularly limited and may be at least 15%, at least 20%, at least 25%, at least 30%, or at least 40%. In this specification, the solidity of the nonwoven fabric is a value (percentage) obtained by dividing the bulk density of the nonwoven fabric by the density of the material constituting the nonwoven fabric and serves as an index of the filling properties, air tightness [sic: corrected from "confidentiality" (error in source Japanese)], breathability, and the like of the nonwoven fabric. The solidity of the nonwoven fabric can be determined by the method described in the working examples.

The ventilation resistance of the nonwoven fabric 2 may be at least 1000 Ns/m³, at least 2000 Ns/m³, at least 3000 Ns/m³, at least 5000 Ns/m³, at least 8000 Ns/m³, or at least 10,000 Ns/m³.

The resin for providing the meltblown fibers 52 constituting the nonwoven fabric 2 is not particularly limited as long as it melts when heated, and can be melted and spun by a meltblown device. A thermoplastic resin or the like can be used as such a resin. The thermoplastic resin can be selected, for example, from polyolefins such as polyethylene (PE) and polypropylene (PP), polyesters such as polyethylene terephthalate (PET) and polybutylene terephthalate (PBT), polyethylene 1,4-cyclohexane dimethanol (PCT), polylactic acid (PLA), polyacrylonitrile, polyacetate, polyamide resins, and other thermoplastic resins such as those known in this technical field. Of these resins, PBT or PP may be used from the perspective of cost, processability, or the like. Further, PP, which has an even lower specific gravity, may be used from the perspective of weight reduction.

The meltblown fibers 52 are not particularly limited in terms of the cross-sectional shape, fiber diameter, length, or the like. The meltblown fibers 52 have a fiber diameter of less than approximately 20 μm and typically approximately from 1 to 10 μm, so the nonwoven fabric web 10 using the meltblown fibers 52 exhibits an increase in the relative number of fibers with respect to the surface density in comparison to sound absorbing materials made of a nonwoven fabric consisting of typical fibers. This makes it possible to efficiently convert the sound energy penetrating through the nonwoven fabric web 10 into air frictional energy, which results in high sound absorption characteristics.

As the binder fibers 54 constituting the nonwoven fabric 2, it is possible to use fibers having portions with lower melting temperature (or softening point temperature) than the melting temperature (or softening point temperature) of the resin providing the meltblown fibers 52 on at least part of the surface thereof. For example, it is possible to use fibers in which the melting temperature (or softening point temperature) of the corresponding portions of the binder fibers 54 is at least approximately 10° C. lower than the melting temperature (or softening point temperature) of the meltblown fibers 52. In addition, in certain embodiments, the temperature may be at least approximately 20° C. lower. Having such portions yields functionality as a binder. The resins given as examples of the resin for providing the meltblown fibers 52 described above can be used as the resin for providing the binder fibers 54. For example, low-melting-point polyethylene terephthalate (PET), polypropylene (PP), polyethylene (PE), or the like can be used as the low-melting-point portion of the binder fibers 54.

The binder fibers 54 do not need to be a material having a uniform melting point throughout, and they can be used as long as they have portions with a low melting temperature (or low softening point temperature) on at least the surface. For example, fibers having a core-sheath structure in which only the sheath portion has a low melting temperature (or low softening point temperature) can be used. When fibers having such a core-sheath structure are used, only the sheath portions of the binder fibers 54 having a low melting temperature (or low softening point temperature) melt when mixed with the meltblown fibers 52, and the core parts remain as fibers along with the meltblown fibers 52.

The binder fibers 54 (short fibers) constituting the nonwoven fabric 2 are not particularly limited in terms of the cross-sectional shape, fiber diameter, or fiber length thereof, but staple fibers with a fiber length of approximately 10 mm to 100 mm produced by cutting spun fibers, for example, can be used.

The fineness of the binder fibers 54 can be varied widely but is typically within a range from 1 decitex (dtex) to 100 decitex. Alternatively, the fineness may be within a range from approximately 2 decitex to 50 decitex or a range from approximately 2 decitex to 15 decitex.

The fiber length of the binder fibers 54 can be varied widely but is preferably within a range from approximately 10 mm to 100 mm and even more preferably within a range from approximately 25 mm to 60 mm, and fibers 150 mm in length may also be used. In addition, the binder fibers may also be crimped so as to have one cm per number of crimps within a range from 1 to 10 or a range from approximately 3 to 5.

The content of the binder fibers 54 is preferably from 30 parts by mass to 85 parts by mass and more preferably from 50 parts by mass to 80 parts by mass per 100 parts by mass of the total amount of the meltblown fibers 52 and the binder fibers 54. By setting the content of the binder fibers 54 to at least 30 parts by mass, it is possible to further improve the flexural rigidity of the resulting nonwoven fabric 2. In addition, by setting the content of the binder fibers 54 to at most 85 parts by mass, it is possible to provide moderate rigidity to the sound absorbing material provided with the resulting nonwoven fabric while maintaining an excellent sound absorption coefficient in the frequency range from 800 Hz to 1000 Hz. The content of the binder fibers 54 can be adjusted by controlling the blowing rate of the binder fibers 54 (that is, the compounding ratio of the binder fibers 54) at the time of the production of the nonwoven fabric 2.

The nonwoven fabric 2 may also contain other constituent materials within a range that does not diminish the effect of the present invention. For example, the nonwoven fabric 2 may contain staple fibers with a melting temperature equal to or higher than that of the resin for providing the meltblown fibers 52.

Since the nonwoven fabric web 10 of the first embodiment is provided with the configuration described above, it has an excellent sound absorption coefficient and can exhibit a particularly excellent sound absorption coefficient in cases in which an air layer and the nonwoven fabric web 10 are arranged continuously. In particular, it has excellent sound absorption in the frequency range from 800 Hz to 1000 Hz. A conventional sound absorbing material (for example, a sound absorbing material provided with a nonwoven fabric web) has a low sound absorption coefficient in the frequency range from 800 Hz to 1000 Hz, even if the material has excellent sound absorption in high frequency ranges. Since sounds in this frequency range correspond to road noise peaks, the nonwoven fabric web 10 of the first embodiment is also suited to vehicle exterior sound absorbing parts such as fender liners.

Next, the nonwoven fabric web of a second embodiment will be described. The nonwoven fabric web of the second embodiment is a nonwoven fabric web with a multilayer structure having a plurality of the nonwoven fabrics described above.

Figure 3:
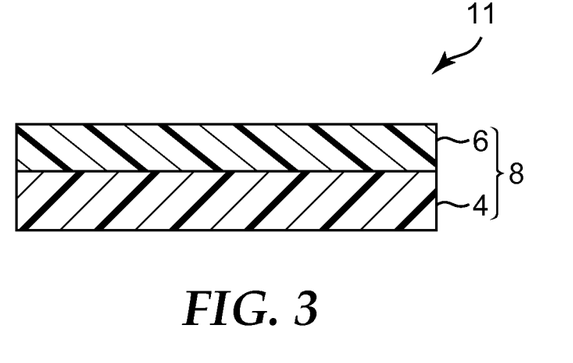
FIG. 3 is a schematic cross-sectional view illustrating an example of a nonwoven fabric web of a second embodiment.

FIG. 3 is a schematic cross-sectional view illustrating an example of the nonwoven fabric web of the second embodiment. The nonwoven fabric web 11 of the second embodiment illustrated in FIG. 3 is a nonwoven fabric web with a two-layer structure consisting of a first nonwoven fabric 4 and a second nonwoven fabric 6. The first nonwoven fabric 4 and the second nonwoven fabric 6 are both nonwoven fabrics having meltblown fibers and binder fibers which are arranged so as to be compounded with the meltblown fibers and fused with the meltblown fibers at some of the compounding points at the very least, but the two nonwoven fabrics may differ from one another in terms of the compositions of fibers constituting the nonwoven fabrics or the ventilation resistance. However, when measured for the entire nonwoven fabric web 11 (two-layer nonwoven fabric), the weight per unit area is within the range from 400 g/m$^2$ to 1500 g/m$^2$, and the flexural rigidity is within the range from 2.0 N/50 mm to 20.0 N/50 mm.

The first nonwoven fabric 4 and the second nonwoven fabric 6 of the nonwoven fabric web 11 of the second embodiment both have the same structure as that of the nonwoven fabric described for the nonwoven fabric web 10 of the first embodiment. That is, binder fibers (short fibers) facing various directions are compounded with meltblown fibers (long fibers), resulting in a nonwoven fabric of a form in which both fibers are fused at some of the intersections of the meltblown fibers and the binder fibers at the very least.

In the nonwoven fabric web 11 of the second embodiment, the weight per unit area of the second nonwoven fabric 6 may be smaller than the weight per unit area of the first nonwoven fabric 4. By using such a two-layer configuration, it is possible to establish higher strength and sound absorption characteristics of the nonwoven fabric web itself.

The nonwoven fabric web 11 of the second embodiment may be one in which the first nonwoven fabric 4 and the second nonwoven fabric 6 are fused by heating and pressing or one in which the first nonwoven fabric 4 and the second nonwoven fabric 6 are attached to one another using an adhesive or the like.

The weight per unit area of the first nonwoven fabric 4 may at least 400 g/m$^2$ and less than 1500 g/m$^2$, at least 600 g/m$^2$ and less than 1500 g/m$^2$, or at least 800 g/m$^2$ and less than 1500 g/m$^2$. By setting the weight per unit area to at least 400 g/m², it is possible to provide the resulting laminate 8 with moderate flexural rigidity, which is preferable. In addition, by setting the weight per unit area to less than 1500 g/m², it is possible to improve the sound absorption coefficient in medium frequency ranges (for example, 800 Hz to 1000 Hz) when the laminate 8 is used, which is preferable.

The weight per unit area of the second nonwoven fabric 6 may be greater than 0 g/m² and at most 400 g/m², greater than 50 g/m² and at most 400 g/m², greater than 200 g/m² and at most 400 g/m², or greater than 300 g/m² and at most 400 g/m².

In the nonwoven fabric web 11 of the second embodiment, the solidity is not particularly limited, but when measured for the entire nonwoven fabric web 11 (two-layer nonwoven fabric), the solidity is preferably at least 15%, at least 20%, at least 25%, at least 30%, or at least 40%. In addition, in the nonwoven fabric web 11, the solidity of the first nonwoven fabric 4 is not particularly limited but may be at least 15%, at least 20%, at least 25%, at least 30%, or at least 40%. Further, by setting the solidity of the first nonwoven fabric 4 to at least 15%, it is possible to establish even higher strength and sound absorption characteristics of the nonwoven fabric web with a two-layer configuration.

The nonwoven fabric webs of the first and second embodiments can be used after being processed into shapes corresponding to the applications thereof. In this case, the nonwoven fabric web is heated and pressed in a mold of a press molding device or the like and molded into a prescribed shape so that a desired molded product is obtained.

The nonwoven fabric webs of the first and second embodiments can also be suitably used as sound absorbing members for vehicle exteriors. For example, the nonwoven fabric webs can be suitably used for fender liners, engine under covers, or body under covers of vehicles. A mode in which the nonwoven fabric 2 is used as a sound absorbing member for a vehicle exterior and, in particular, for a fender liner for an automobile, will be described hereinafter.

Figure 4A:
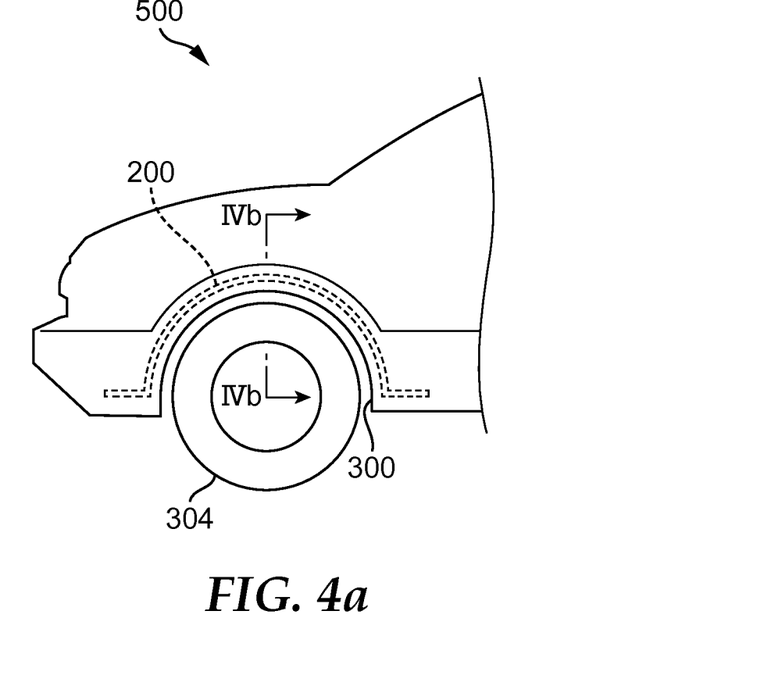
Figure 4B:
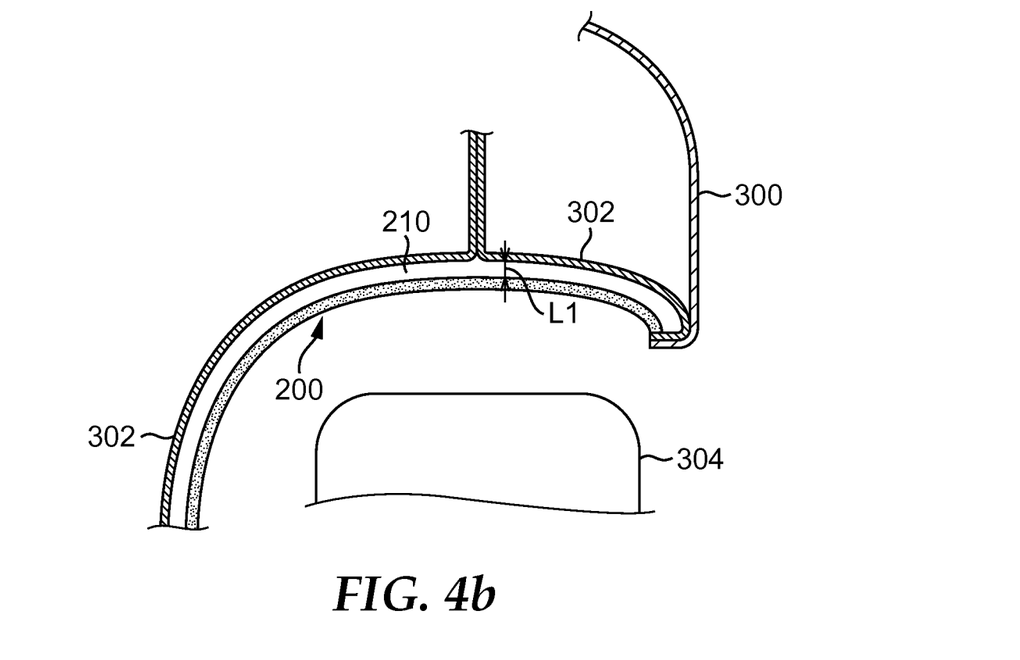

FIG. 4 is a schematic cross-sectional view illustrating an example of the mounting position of a fender liner. As illustrated in FIGS. 4(*a*) and (*b*), a fender liner (nonwoven fabric web molded into a shape corresponding to the tire housing) 200 is fixed to a tire housing 302 formed inside a car body 500 (underneath a fender 300 and above a tire 304) so as to be positioned at a distance from the tire housing 302.

The attachment means (or fixing means) for attaching the fender liner 200 to the tire housing 302 is not particularly limited. For example, a holding means (for example, a clip) may be provided on the tire housing side so as to fix the tire housing 302 to the fender liner 200, or a hole may be provided in the fender liner 200 so as to fix it to the tire housing by fitting.

The space 210 formed by the fender liner 200 and the tire housing 302 may be a layer consisting of a sound absorbing member comprising an air layer, a felt layer, or the like. When layers consisting of sound absorbing members are provided, these layers are formed integrally with the fender liner and can function as a sound absorbing structure for preventing the noise of the vehicle or vehicle external noise (moving car noise or the like generated when traveling) from infiltrating into the vehicle. That is, the sound absorbing structure of this embodiment is provided with a sound absorbing layer such as a fender liner and a layer consisting of a sound absorbing member comprising an air layer, a felt layer, or the like. A structure in which the layer consisting of a sound absorbing member is an air layer is preferable as a sound absorbing structure.

The thickness L1 of the layer consisting of a sound absorbing member may be from 5 to 40 mm and, in one mode, is from 5 to 20 mm.

From another perspective, this embodiment provides a fender liner attachment structure for attaching the fender liner 200 to the tire housing 302 of an automobile, wherein the fender liner 200 is positioned and attached at a distance from the tire housing 302, and the fender liner 200 contains the nonwoven fabric web described above.

In the fender liner attachment structure described above, the attachment mode described above is not particularly limited and may be, for example, one in which the fender liner 200 is fixed to the tire housing 302 by a holding means (for example, a clip) provided on the tire housing 302 side, or one in which the fender liner 200 is fixed by providing a hole in the fender liner 200 and fitting it onto the tire housing 302.

In addition, in the attachment structure of the fender liner described above, the space 210 formed by the fender liner 200 and the tire housing 302 may be a layer consisting of a sound absorbing member comprising an air layer, a felt layer, or the like.

When layers consisting of sound absorbing members are provided, these layers are formed integrally with the fender liner and can function as a sound absorbing structure for preventing the noise of the vehicle or vehicle external noise (moving car noise or the like generated when traveling) from infiltrating into the vehicle. A structure in which an air layer is provided is preferable as a sound absorbing structure.

From another perspective, this embodiment can also be viewed as a method for preventing the infiltration of vehicle external noise into the vehicle. That is, this embodiment provides a method for preventing the infiltration of vehicle external noise into the vehicle, wherein a fender liner is positioned at a distance from a tire housing, and the fender liner is provided with the nonwoven fabric web described above. In the method of this embodiment, the fender liner may be positioned so as to be distanced from the tire housing by 5 to 40 mm or may be positioned so as to be distanced from the tire housing by 5 to 20 mm. When the surface of the tire housing is not smooth, the separation distance between the tire housing and the fender liner can be considered the average value thereof.

With the method described above, a sound absorbing structure comprising a sound absorbing material layer consisting of a fender liner provided with the nonwoven fabric web described above and a layer consisting of a sound absorbing member including an air layer or the like is formed at the lower part of a tire housing, which yields excellent performance for preventing the infiltration of vehicle external noise into the vehicle. In particular, this yields an excellent sound absorption coefficient in a frequency range from 800 Hz to 1000 Hz, which makes it possible to efficiently prevent the infiltration of road noise into the vehicle.

WORKING EXAMPLES

The present invention will be described more specifically hereinafter using working examples, but the present invention is not limited to the following working examples.

Working Example 1

Polypropylene (produced by Sun Allomer Ltd.) was used as meltblown fibers, and meltblown fibers with a fiber diameter of 2.9 μm were spun from a meltblown die by an extruder so that the weight per unit area was 137 g/m². Binder fibers of 460 g/m² having a core-sheath structure having polyethylene terephthalate as a core material and a polyethylene terephthalate copolymer as a sheath material (4080 produced by Unitika Ltd., fineness: 6.6 dtex, fiber length: 32 mm) was mixed so as to merge with the web immediately after the meltblown fibers were spun, and a web with a total weight per unit area of 597 g/m² was thereby produced. This web was heated and compressed for 60 seconds under conditions at 137° C. and 10 MPa so as to obtain a nonwoven fabric (1) with a thickness of 1.8 mm. In this way, a nonwoven fabric web consisting of a single layer of the nonwoven fabric (1) was obtained. The specific gravity of the meltblown fibers was 0.91 g/cm³, and the specific gravity of the binder fibers was 1.38 g/cm³. In addition, the specific gravity of the meltblown fibers was 0.91 g/cm³, and the specific gravity of the binder fibers was 1.38 g/cm³ [sic: this sentence is repeated verbatim in the source].

The weight per unit area, flexural rigidity, thickness, bulk density, solidity, and ventilation resistance of the nonwoven fabric (1) were measured based on the methods described below. The results are shown in Table 1. In addition, the fiber diameter can be measured with the method described below.

Measurement of Weight Per Unit Area

The weight per unit area (g/m²) of the nonwoven fabric (1) was measured by preparing three fabrics in which the nonwoven fabric (1) was cut out into a circular shape with a diameter of 133 mm and measuring the weight of each sample. The weight per unit area was determined from the average value of the three fabrics.

Measurement of Flexural Rigidity

The flexural rigidity of the nonwoven fabric (1) was measured based on the three-point flexural test (method A) of JIS K7074 (1998).

Thickness

The thickness (mm) of the nonwoven fabric (1) was measured using a measurement method according to ASTM F778-88. First, three fabrics in which the nonwoven fabric (1) was cut out into a circular shape with a diameter of 133 mm were prepared. A measurement device provided with a pair of plates including an upper plate and a lower plate with a diameter of 100 mm was prepared, and after a weight of 16 g was placed on the upper plate and lifted up, a sample was placed in the center of the lower plate. The distance between the upper and lower plates was adjusted to a height of 1.0 cm, and the upper plate was moved away from this height and dropped onto the lower plate under its own weight. After waiting three seconds in this state, the distance between the upper and lower plates was measured with a provided micrometer. The measured value was used as the thickness of the nonwoven fabric (1).

Measurement of Solidity

The solidity (%) of the nonwoven fabric (1) indicates a value determined by dividing the bulk density ρ1 of the nonwoven fabric (1) by the density ρ2 of the material constituting the nonwoven fabric (1) and was expressed as a percentage. The bulk density ρ1 of the nonwoven fabric (1) was determined by dividing the weight per unit area of the nonwoven fabric (1) determined by the method described above by the thickness of the nonwoven fabric (1) determined by the method described above. In addition, the density ρ2 was determined from the density of the meltblown fibers and binder fibers provided by the raw material supplier and the compounding ratio of the meltblown fibers and the binding fibers.

Measurement of Ventilation Resistance

The ventilation resistance (Ns/m³) of the nonwoven fabric (1) was measured based on ASTM C 522. A fabric in which the nonwoven fabric (1) was cut out into a circular shape with a diameter of 5.25 inches (13.33 mm) was prepared. The nonwoven fabric (1) cut out into a circular shape was fixed to a sample stage. Compressed air was supplied in the perpendicular direction in a range of 100 cm² of the nonwoven fabric (1), and the pressure difference generated in the direction perpendicular to the surface of the nonwoven fabric was measured.

Measurement of Vertical Incident Sound Absorption Coefficient

The sound absorption coefficient of the nonwoven fabric web was measured with a two-microphone method based on E 1050-98 of ASTM ("Impedance and Absorption Using A Tube, Two Microphones and A Digital Frequency Analysis System."). The measurement range was set to 125 Hz to 1600 Hz. The two-microphone method is a method of determining the sound absorption coefficient by measuring the incident and reflective components of sound pressure in an acoustic impedance tube with two microphones. Specifically, a nonwoven fabric web was set at a distance of 10 mm from a rigid body surface (a 10 mm air layer was provided) inside an acoustic impedance tube with one end serving as a rigid body surface, and the sound absorption coefficient was measured by inserting sound pressure from the surface of the opposite side as the side of the surface serving as the rigid body surface of the nonwoven fabric web.

TABLE 1

|  | NONWOVEN FABRIC | CONTENT (PARTS BY MASS) | | WEIGHT PER UNIT AREA (g/m²) | FLEXURAL RIGIDITY (N/50 mm) | THICKNESS (mm) |
| --- | --- | --- | --- | --- | --- | --- |
|  |  | MELTBLOWN FIBERS | BINDER FIBERS |  |  |  |
| WORKING EXAMPLE 1 | (1) | 23 | 77 | 597 | 3.5 | 1.8 |
| WORKING EXAMPLE 2 | (2) | 23 | 77 | 641 | 5.4 | 2.5 |
| WORKING EXAMPLE 3 | (3) | 27 | 73 | 557 | 3.0 | 1.6 |
| WORKING EXAMPLE 4 | (4) | 47 | 53 | 653 | 4.9 | 1.7 |
| WORKING EXAMPLE 5 | (5) | 23 | 77 | 879 | 7.7 | 1.7 |
| WORKING EXAMPLE 6 | (6) | 23 | 77 | 907 | 11.9 | 2.4 |
| COMPARATIVE EXAMPLE 1 | (A) | 23 | 77 | 438 | 1.8 | 1.7 |
| COMPARATIVE EXAMPLE 2 | (B) | 75 | 25 | 201 | 0.2 | 1.5 |
| COMPARATIVE EXAMPLE 3 | (C) | 75 | 25 | 292 | 0.6 | 1.6 |
| COMPARATIVE EXAMPLE 4 | (D) | 75 | 25 | 367 | 0.9 | 1.4 |

TABLE 1-continued

| | BULK DENSITY | SOLIDITY | VENTILATION RESISTANCE | SOUND ABSORPTION COEFFICIENT | |
|---|---|---|---|---|---|
| | (g/cm³) | (%) | (Ns/m³) | 800 Hz | 1000 Hz |
| WORKING EXAMPLE 1 | 0.33 | 26.1 | 3767 | 0.34 | 0.63 |
| WORKING EXAMPLE 2 | 0.26 | 20.2 | 2360 | 0.30 | 0.50 |
| WORKING EXAMPLE 3 | 0.35 | 27.8 | 5621 | 0.28 | 0.59 |
| WORKING EXAMPLE 4 | 0.38 | 33.1 | 17871 | 0.26 | 0.67 |
| WORKING EXAMPLE 5 | 0.52 | 40.7 | 12254 | 0.34 | 0.73 |
| WORKING EXAMPLE 6 | 0.38 | 29.7 | 6523 | 0.48 | 0.78 |
| COMPARATIVE EXAMPLE 1 | 0.26 | 20.9 | 1716 | 0.27 | 0.46 |
| COMPARATIVE EXAMPLE 2 | 0.13 | 13.0 | 1569 | 0.14 | 0.28 |
| COMPARATIVE EXAMPLE 3 | 0.18 | 17.8 | 3915 | 0.19 | 0.40 |
| COMPARATIVE EXAMPLE 4 | 0.26 | 25.5 | 7581 | 0.17 | 0.40 |

Measurement of Fiber Diameter

The fiber diameter (μm) of the meltblown fibers was measured with the following method.

Figure 5A:
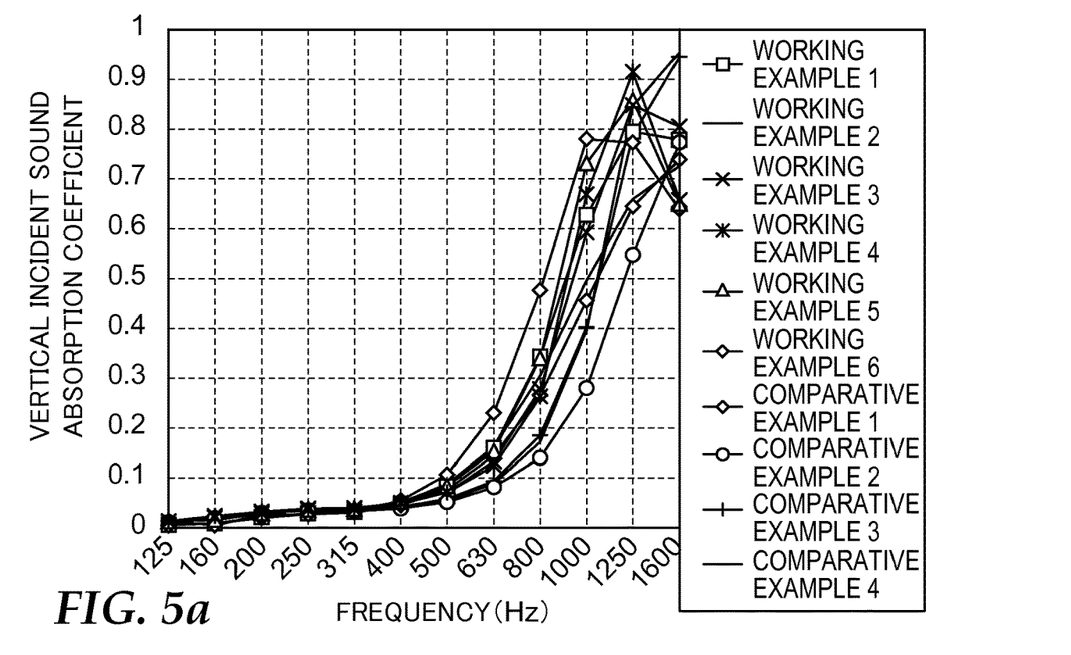
Figure 5B:
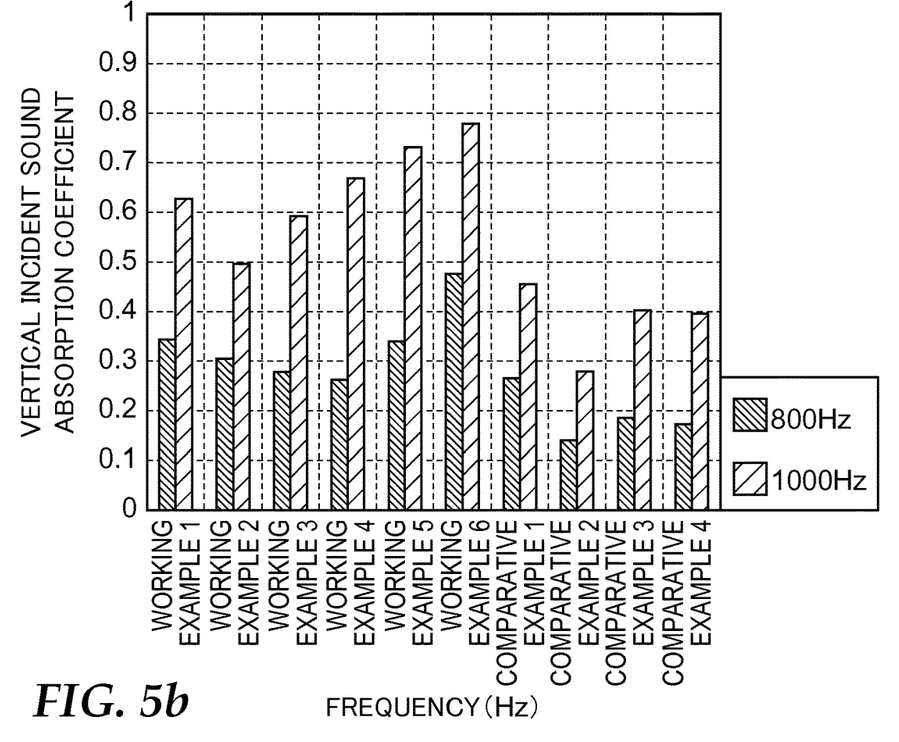

The fiber diameter (μm) of the meltblown fibers was determined by measuring the "mean geometric diameter" of fibers by image analysis of an SEM microscope photograph of a nonwoven fabric segment. More specifically, a 1 cm×1 cm test segment was cut out from a nonwoven fabric web test segment and attached to a sample stage of a scanning electron microscope. The sample stage on which the sample segment was placed was inserted into the scanning microscope, and an image thereof was observed in a low-vacuum mode using an acceleration voltage of 20 kV, an operating distance of approximately 15 mm, and a sample tilt of 0°. The geometric diameter was measured using reflected electron images captured at magnifications of 500× and 1000×. In the electron microscope photograph of each sample, the geometric diameter was measured for 5 to 10 meltblown fibers selected arbitrarily, and the average value thereof was used as the "mean geometric diameter".

shown in Table 1. FIG. 5 illustrates the results of sound absorption coefficient measurements performed on the nonwoven fabric webs of Working Examples 1 to 6 and Comparative Examples 1 to 4.

Working Example 7

A nonwoven fabric web with a two-layer configuration was obtained by attaching a nonwoven fabric (2) obtained in Working Example 2 and a nonwoven fabric (B) obtained in Comparative Example 2 with an adhesive. The weight per unit area, flexural rigidity, thickness, bulk density, solidity, and ventilation resistance of the resulting nonwoven fabric web consisting of two layers were evaluated in the same manner as in Working Example 1, and the vertical incident sound absorption coefficient of the nonwoven fabric web with a two-layer configuration was evaluated. The results are shown in Table 2. The measurement of the vertical incident sound absorption coefficient was performed by placing the nonwoven fabric web so that the first nonwoven fabric was on the incident side of sound pressure.

TABLE 2

| | FIRST NONWOVEN FABRIC | SECOND NONWOVEN FABRIC | WEIGHT PER UNIT AREA (g/m²) | FLEXURAL RIGIDITY (N/50 mm) | THICKNESS (mm) | SOLIDITY (%) | VENTILATION RESISTANCE (Ns/m³) | SOUND ABSORPTION COEFFICIENT | |
|---|---|---|---|---|---|---|---|---|---|
| | | | | | | | | 800 Hz | 1000 Hz |
| WORKING EXAMPLE 7 | NONWOVEN FABRIC (2) | NONWOVEN FABRIC (B) | 842 | 6.3 | 4.0 | 25.5 | 3848 | 0.53 | 0.73 |
| WORKING EXAMPLE 8 | NONWOVEN FABRIC (2) | NONWOVEN FABRIC (D) | 1008 | 7.8 | 3.9 | 30.6 | 9016 | 0.65 | 0.78 |
| WORKING EXAMPLE 9 | NONWOVEN FABRIC (6) | NONWOVEN FABRIC (D) | 1274 | 15.9 | 3.8 | 40.3 | 12438 | 0.80 | 0.66 |

Working Examples 2 to 6 and Comparative Examples 1 to 4

Nonwoven fabric webs were obtained by preparing nonwoven fabrics in the same manner as in Working Example 1 with the exception that the conditions for heating and compression were adjusted appropriately so as to achieve the content ratios listed in Table 1. The weight per unit area, flexural rigidity, thickness, bulk density, solidity, and ventilation resistance of the resulting nonwoven fabric webs were measured in the same manner as in Working Example 1. The vertical incident sound absorption coefficients of the nonwoven fabric webs were also evaluated. The results are Working Examples 8 and 9

Figure 6A:
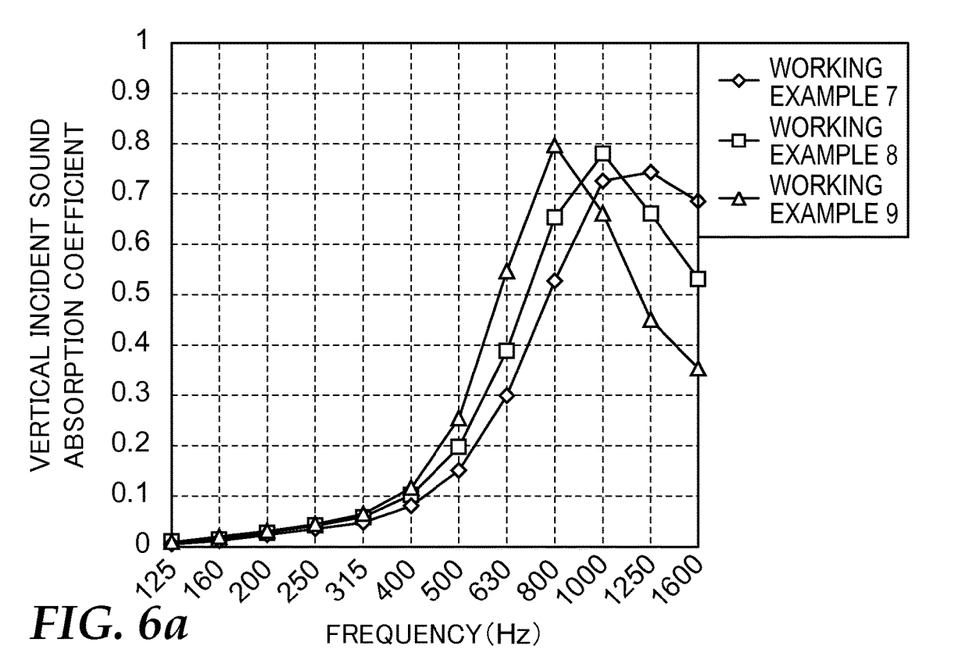
Figure 6B:
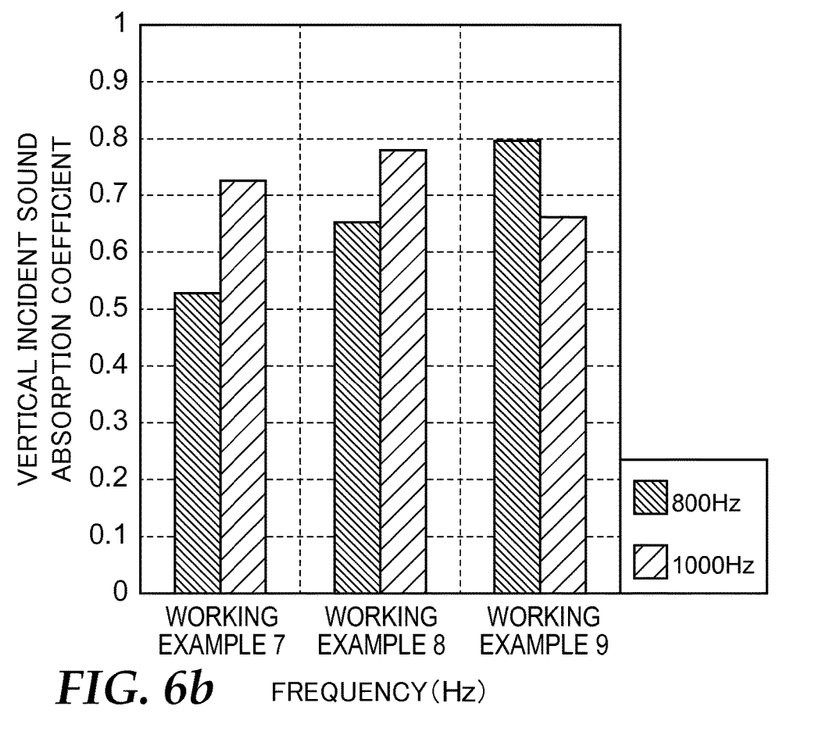

Nonwoven fabric webs with a two-layer configuration were obtained in the same manner as in Working Example 7 with the exception that the nonwoven fabrics listed in Table 2 were used as the first nonwoven fabric and the second nonwoven fabric. The weight per unit area, flexural rigidity, thickness, bulk density, filling rate, and ventilation resistance of the nonwoven fabrics consisting of two layers were evaluated in the same manner as in Working Example 1, and the vertical incident sound absorption coefficients of the nonwoven fabric webs with a two-layer configuration were evaluated. The results are shown in Table 2. FIG. 6 illustrates the results of vertical incident sound absorption coefficient measurements performed on the nonwoven fabric webs of Working Examples 7 to 9. The measurement of the vertical incident sound absorption coefficient was performed by placing the nonwoven fabric web so that the first nonwoven fabric was on the incident side of sound pressure.

Reference Examples 1 to 5

Figure 7A:
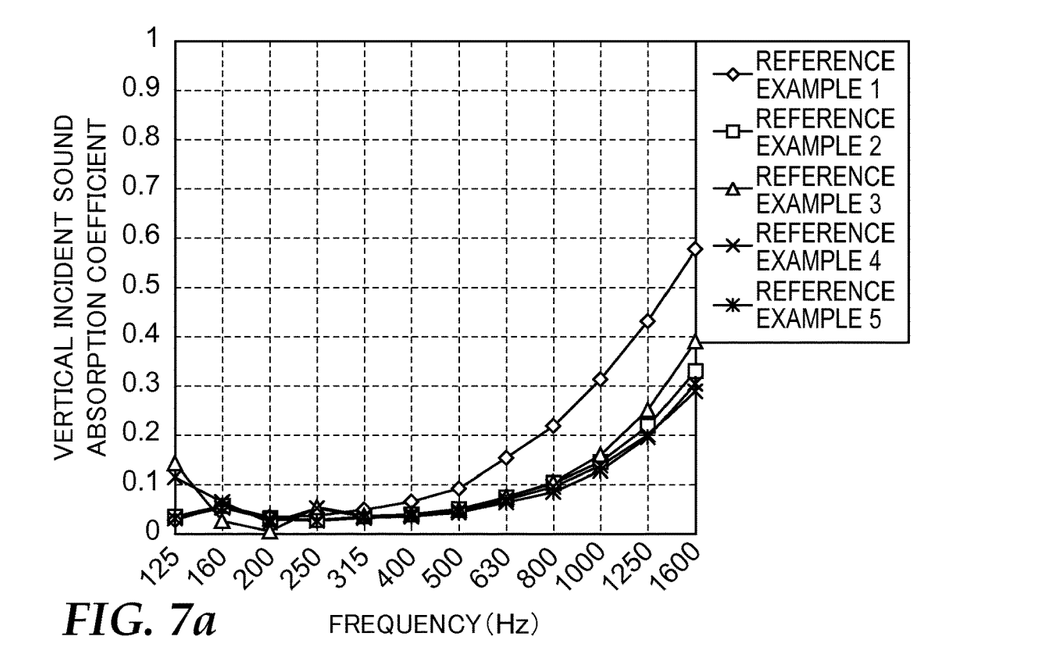
Figure 7B:
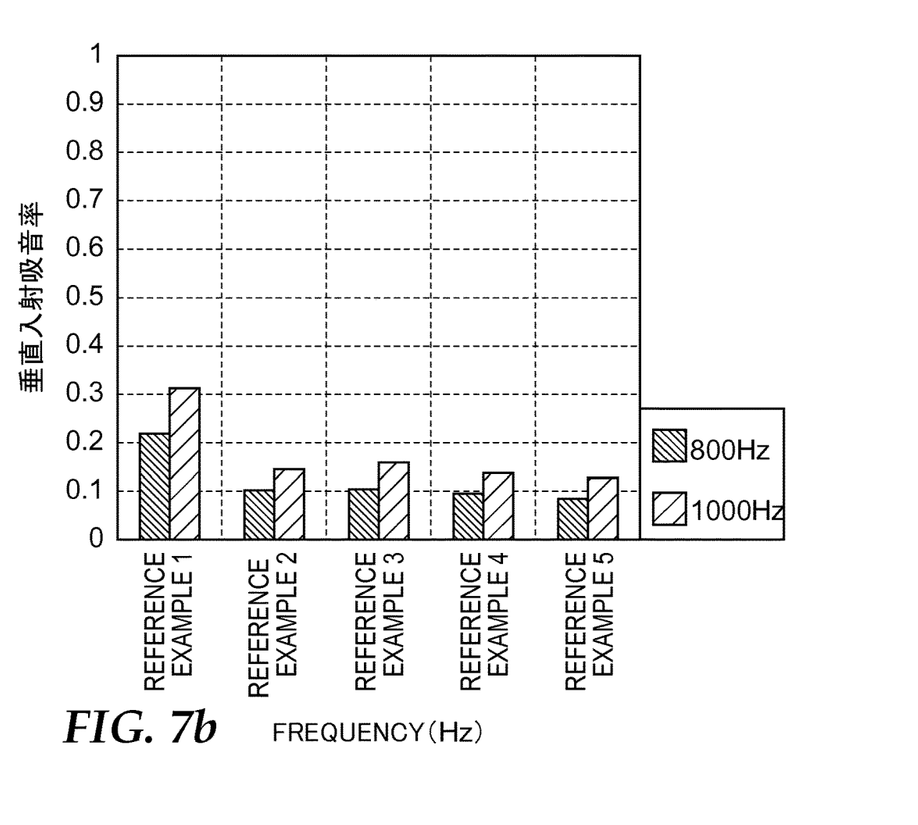

As reference examples, for sound absorbing materials (1) to (5) circulated as sound absorbing materials for fender liners consisting of nonwoven fabrics comprising staple fibers and binder fibers, the weight per unit area, flexural rigidity, thickness, and ventilation resistance of the sound absorbing materials were evaluated with the same methods as in Working Example 1, and the vertical incident sound absorption coefficients of the sound absorbing materials were evaluated. The results are shown in Table 3. The measurement of the vertical incident sound absorption coefficient was performed by placing the nonwoven fabric web so that the first nonwoven fabric was on the incident side of sound pressure. FIG. 7 illustrates the results of vertical incident sound absorption coefficient s performed on the sound absorbing materials of Reference Examples 1 to 5.

TABLE 3

| | SOUND ABSORBING MATERIAL | NONWOVEN FABRIC RAW MATERIAL | WEIGHT PER UNIT AREA (g/m²) | FLEXURAL RIGIDITY (N/50 mm) | THICKNESS (mm) | VENTILATION RESISTANCE (Ns/m³) | SOUND ABSORPTION COEFFICIENT | |
|---|---|---|---|---|---|---|---|---|
| | | | | | | | 800 Hz | 1000 Hz |
| REFERENCE EXAMPLE 1 | (1) | PET + PP | 954 | 1.5 | 3.7 | 718 | 0.22 | 0.31 |
| REFERENCE EXAMPLE 2 | (2) | PET + SBR | 786 | 1.2 | 2.3 | 294 | 0.10 | 0.15 |
| REFERENCE EXAMPLE 3 | (3) | DETAILS UNKNOWN | 988 | 1.8 | 2.9 | 405 | 0.10 | 0.16 |
| REFERENCE EXAMPLE 4 | (4) | DETAILS UNKNOWN | 1025 | 1.9 | 3.2 | 239 | 0.10 | 0.14 |
| REFERENCE EXAMPLE 5 | (5) | PET + SBR | 759 | 0.86 | 2.7 | 221 | 0.09 | 0.13 |

In Table 3, PET refers to polyethylene terephthalate, PP refers to polypropylene, and SBR refers to styrene-butadiene rubber.

What is claimed is:

1. A nonwoven fabric web for attenuating road noise in an automotive vehicle provided with a nonwoven fabric having:
    meltblown fibers; and
    binder fibers arranged so as to be confounded with the meltblown fibers and fused with the meltblown fibers at some of the confounding points at the very least;
    the weight per unit area of the nonwoven fabric being from 400 g/m² to 1500 g/m², and the flexural rigidity of the nonwoven fabric being from 2.0 N/50 mm to 20.0 N/50 mm, as measured according to the three-point flexural test (method A) of JIS K7074 (1998), wherein the nonwoven fabric web has a solidity of at least 15%, and wherein the nonwoven fabric web has a Sound Absorption Coefficient of at least 0.26 at 800 Hz and at least 0.5 at 1000 Hz, and
    wherein the nonwoven fabric web has a shape corresponding to a tire housing of the automotive vehicle.

2. The nonwoven fabric web according to claim 1, wherein the content of the binder fibers is from 30 parts by mass to 85 parts by mass per 100 parts by mass of a total amount of the meltblown fibers and the binder fibers.

3. The nonwoven fabric web according to claim 1, wherein the nonwoven fabric is a laminate of a plurality of nonwoven fabrics provided with the meltblown fibers and the binder fibers.

4. The nonwoven fabric web according to claim 3, wherein the nonwoven fabric is a laminate of first and second nonwoven fabrics provided with the meltblown fibers and the binder fibers, with the first nonwoven fabric having a weight per unit area of at least 400 g/m² and less than 1500 g/m², and the second nonwoven fabric having a weight per unit area of greater than 0 g/m² and at most 400 g/m².

5. The nonwoven fabric web according to claim 4, wherein the content of the binder fibers in the first nonwoven fabric is from 30 parts by mass to 85 parts by mass per 100 parts by mass of a total amount of the meltblown fibers and the binder fibers constituting the first nonwoven fabric.

6. The nonwoven fabric web according to claim 1, wherein the nonwoven fabric web is a sound absorbing member for a vehicle exterior.

7. The nonwoven fabric web according to claim 1, wherein the nonwoven fabric web forms at least part of a fender liner, engine under cover, or body under cover of a vehicle.

8. A vehicle body part comprising a nonwoven fabric web according to claim 1 mounted within the body.

9. The nonwoven fabric web according to claim 2, wherein the nonwoven fabric is a laminate of a plurality of nonwoven fabrics provided with the meltblown fibers and the binder fibers.

10. The nonwoven fabric web according to claim 9, wherein the nonwoven fabric is a laminate of first and second nonwoven fabrics provided with the meltblown fibers and the binder fibers, with the first nonwoven fabric having a weight per unit area of at least 400 g/m² and less than 1500 g/m², and the second nonwoven fabric having a weight per unit area of greater than 0 g/m² and at most 400 g/m².

11. The nonwoven fabric web according to claim 10, wherein the content of the binder fibers in the first nonwoven fabric is from 30 parts by mass to 85 parts by mass per 100 parts by mass of a total amount of the meltblown fibers and the binder fibers constituting the first nonwoven fabric.

12. A method of producing a nonwoven fabric web according to claim 1, said method comprising:

supplying a blown flow of meltblown fibers;
blowing binder fibers against the flow of meltblown fibers so as to incorporate the binder fibers into the flow of the meltblown fibers and form a mixture of the binder fibers and meltblown fibers;
forming the mixture of meltblown and binder fibers into a web.

13. The method according to claim 12, further comprising: heating and pressing the web.

* * * * *